(12) United States Patent
Masuda et al.

(10) Patent No.: US 9,334,377 B2
(45) Date of Patent: May 10, 2016

(54) PROCESS FOR PRODUCING RESIN COMPOSITION CONTAINING ACTIVE PARTICLES

(71) Applicant: MITSUBISHI GAS CHEMICAL COMPANY, INC., Tokyo (JP)

(72) Inventors: Akihiro Masuda, Tokyo (JP); Yoshiki Itou, Tokyo (JP); Kiyonori Michiba, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/415,656

(22) PCT Filed: Jul. 19, 2013

(86) PCT No.: PCT/JP2013/069645
§ 371 (c)(1),
(2) Date: Jan. 19, 2015

(87) PCT Pub. No.: WO2014/014083
PCT Pub. Date: Jan. 23, 2014

(65) Prior Publication Data
US 2015/0225513 A1 Aug. 13, 2015

(30) Foreign Application Priority Data
Jul. 20, 2012 (JP) .................... 2012-161627

(51) Int. Cl.
*C08J 3/205* (2006.01)
*C08J 3/20* (2006.01)
*C08K 3/08* (2006.01)
*C08L 101/00* (2006.01)

(52) U.S. Cl.
CPC .. *C08J 3/203* (2013.01); *C08J 3/20* (2013.01); *C08J 3/201* (2013.01); *C08K 3/08* (2013.01); *C08L 101/00* (2013.01); *C08J 2323/06* (2013.01)

(58) Field of Classification Search
CPC ................................. C08J 3/2053; C08K 3/08
USPC ............................ 523/333; 524/439, 440, 441
See application file for complete search history.

(56) References Cited

U.S. PATENT DOCUMENTS

| | | | |
|---|---|---|---|
| 5,159,005 A | 10/1992 | Frandsen et al. | |
| 5,744,056 A | 4/1998 | Venkateshwaran et al. | |
| 2002/0086929 A1 | 7/2002 | Chiang et al. | |
| 2006/0264553 A1 | 11/2006 | Karger-Kocsis | |
| 2010/0255231 A1 | 10/2010 | Chau et al. | |
| 2011/0028605 A1* | 2/2011 | Nelson | B82Y 30/00 523/453 |
| 2013/0165559 A1 | 6/2013 | Wissemborski et al. | |

FOREIGN PATENT DOCUMENTS

| | | |
|---|---|---|
| DE | 103 48 548 | 5/2005 |
| DE | 10 2010 03134 | 1/2012 |
| JP | 62-277148 | 12/1987 |
| JP | 3-505888 | 12/1991 |
| JP | 2004-250542 | 9/2004 |
| JP | 2005-60494 | 3/2005 |
| JP | 2005-104064 | 4/2005 |
| JP | 2007-185653 | 7/2007 |
| JP | 2011-111562 | 6/2011 |
| WO | 2008/099935 | 8/2008 |
| WO | 2008/133057 | 11/2008 |
| WO | 2010/120435 | 10/2010 |

OTHER PUBLICATIONS

International Search Report from PCT/JP2013/069645, mail date is Aug. 13, 2013, with English Translation thereof.
China Office action, mail date is Sep. 28, 2014.
International Preliminary Report on Patentability for PCT application No. PCT/JP2013/069645 and Written Opinion, mailing date Jan. 20, 2015, with English Translation thereof.
Extended Search Report issued by European Patent Office (EPO) in EPO Patent Application No. 13820005.0, dated Jan. 27, 2016.

* cited by examiner

Primary Examiner — Edward Cain
(74) Attorney, Agent, or Firm — Greenblum & Bernstein, P.L.C.

(57) ABSTRACT

There is provided a process for producing a resin composition in a safe and cost-effective manner, the resin composition being a dispersion of active particles reactive with oxygen in a thermoplastic resin. The process is one for producing a resin composition containing at least a thermoplastic resin and active particles that have been dispersed in the thermoplastic resin and are reactive with oxygen in an atmosphere, the process comprising the steps of: protecting the active particles with a dispersion medium to prevent oxygen in the atmosphere from contacting with the active particles; removing the dispersion medium while melt-kneading the thermoplastic resin and the active particles protected with the dispersion medium to replace the dispersion medium with the thermoplastic resin; and cooling and solidifying the thermoplastic resin with the active particles dispersed therein.

13 Claims, No Drawings

PROCESS FOR PRODUCING RESIN COMPOSITION CONTAINING ACTIVE PARTICLES

TECHNICAL FIELD

The present invention relates to a process for producing a resin composition including a dispersion of active particles in a thermoplastic resin, the active particles being reactive with oxygen in an atmosphere. More specifically, the present invention relates to a process for producing a resin composition including a dispersion of active particles in a thermoplastic resin in a safe and cost-effective manner.

BACKGROUND ART

One of techniques for preserving foods, pharmaceutical products and the like is preservation utilizing oxygen absorbing agents (oxygen scavengers) that remove oxygen in an atmosphere. Specifically, the preservation utilizing oxygen absorbing agents is a technique in which an oxygen scavenger capable of absorbing oxygen in atmosphere, together with an object, is placed and hermetically sealed in a packaging body. A technique that has recently become used is that a deterioration in an object within a packaging body by oxygen is suppressed without enclosing an oxygen absorbing agent by imparting an oxygen absorbing capability to the packaging body per se. The packaging body having the oxygen absorbing capability is prepared by extruding a resin composition including an oxygen absorbing agent incorporated in a thermoplastic resin commonly used as a material for packaging body materials into a film or sheet that is then formed into a packaging body.

In addition to conventional inorganic main agents such as iron powders and sulfites and organic main agents such as L-ascorbic acid and erythorbic acid, oxygen absorbing agents that do not require water in oxygen absorption have recently become used. Such oxygen absorbing agents include, for example, oxygen scavengers including cerium oxide utilizing oxygen defects as a main agent (for example, Japanese Patent Application Laid-Open No. 185653/2007, International Publication No. 099935/2008, and International Publication No. 133057/2008), oxygen scavengers including titanium oxide containing oxygen defects as a main agent (for example, Japanese Patent Application Laid-Open No. 104064/2005), oxygen scavengers including a metal subjected to hydrogen reduction as a main agent (for example, Japanese Patent Application Laid-Open No. 277148/1987), and oxygen scavengers that utilize autoxidation of organic substances. These oxygen absorbing agents are directly reacted with oxygen without through water to absorb oxygen within the packaging body and thus are suitable for preservation for antirust purposes of pharmaceuticals or dried foods that require use or preservation under dry conditions, or metallic products that are damaged by water or moisture.

On the other hand, the above oxygen absorbing agents are directly reacted with oxygen in an atmosphere and thus, when stored in air, are likely to suffer from a safety problem, for example, a deterioration in an oxygen absorbing capability with the elapse of time or spontaneous ignition in air in an extreme case as a result of a reaction with oxygen in air. For this reason, the oxygen absorbing agents are in many cases used in the form of a dispersion of the oxygen absorbing agents in resins. In the dispersion of oxygen absorbing agents in resins, however, the oxygen absorbing agents are disadvantageously reacted with oxygen in an atmosphere, and, thus, a method should be adopted in which oxygen absorbing agents are added to resins in an inert gas or in vacuo or in which, when oxygen absorbing agents are added to resins, the activity of the oxygen absorbing agents is temporarily lowered. For example, Japanese Patent Application Laid-Open No. 185653/2007 proposes that a reaction with oxygen in an atmosphere is suppressed by lowering the specific surface area of oxygen scavenger particles. Further, International Publication No. 099935/2008 proposes that active sites of oxygen absorbing agents reactive with oxygen are closed by carbon dioxide followed by dispersion in resins. Furthermore, International Publication No. 133057/2008 proposes that antioxidants are added to resins in a nitrogen atmosphere.

PRIOR ART DOCUMENTS

Patent Documents

Patent Document 1: Japanese Patent Application Laid-Open No. 185653/2007
Patent Document 2: International Publication No. 099935/2008
Patent Document 3: International Publication No. 133057/2008
Patent Document 4: Japanese Patent Application Laid-Open No. 104064/2005
Patent Document 5: Japanese Patent Application Laid-Open No. 277148/1987

SUMMARY OF THE INVENTION

Problems to be Solved by the Invention

The present inventors have now found that a resin composition including a dispersion of an oxygen absorbing agent in a resin can be obtained without contact of the oxygen absorbing agent with oxygen by, in adding the oxygen absorbing agent reactive with oxygen in an atmosphere to the resin, adding the oxygen absorbing agent to the resin while protecting the oxygen absorbing agent with water, and removing water while melt-kneading the oxygen absorbing agent with the resin to replace water present around the oxygen absorbing agent with the resin. Further, it was found that, according to this method, a resin composition including a dispersion of an oxygen absorbing agent in a resin can be obtained in a safe and cost-effective manner. The present invention has been made based on such finding.

Accordingly, an object of the present invention is to provide a process for producing a resin composition including a dispersion of active particles reactive with oxygen in a thermoplastic resin in a safe and cost-effective manner.

Means for Solving the Problems

According to an aspect of the present invention, there is provided a process for producing a resin composition comprising at least a thermoplastic resin and active particles that have been dispersed in the thermoplastic resin and are reactive with oxygen in an atmosphere, the process comprising the steps of:

protecting the active particles with a dispersion medium to prevent oxygen in the atmosphere from contacting with the active particles;

removing the dispersion medium while melt-kneading the thermoplastic resin and the active particles protected with the dispersion medium to replace the dispersion medium with the thermoplastic resin; and cooling and solidifying the thermoplastic resin with the active particles dispersed therein.

In an embodiment of the present invention, the active particles are formed of a metal obtained by subjecting an alloy comprising
(A) at least one transition metal selected from the group consisting of manganese, iron, platinum, and copper group metals and
(B) at least one metal selected from the group consisting of aluminum, zinc, tin, lead, magnesium, and silicon,
to treatment with an acidic or alkaline aqueous solution to elute and remove at least a part of the component (B).

In an embodiment of the present invention, the active particles protected with the dispersion medium are melt-kneaded as a slurry comprising the active particles and the dispersion medium, with the thermoplastic resin.

In an embodiment of the present invention, the dispersion medium is selected from the group consisting of water, organic solvents, and mixtures composed of water and organic solvents.

In an embodiment of the present invention, the slurry contains 10 to 90% by weight of the dispersion medium.

In an embodiment of the present invention, when the dispersion medium is removed from the slurry, a part of the dispersion medium is removed as a gas and/or a liquid.

In an embodiment of the present invention, the dispersion medium is replaced with the thermoplastic resin by removing the dispersion medium from the slurry until the content of the dispersion medium in the resin composition is not more than 5000 ppm.

In an embodiment of the present invention, the dispersion medium is water.

In an embodiment of the present invention, the metal obtained by eluting and removing at least a part of the component (B) is porous.

In an embodiment of the present invention, the component (A) is selected from the group consisting of iron, cobalt, nickel, and copper.

In an embodiment of the present invention, the component (B) is aluminum.

In an embodiment of the present invention, the content of the component (B) in the metal obtained by eluting and removing at least a part of the component (B) is 0.01 to 50% by weight.

In an embodiment of the present invention, the metal obtained by eluting and removing at least a part of the component (B) has a specific surface area of at least 10 $m^2/g$ as measured by a BET method.

In an embodiment of the present invention, the thermoplastic resin is at least one resin selected from the group consisting of polyolefin resins, polyester resins, polyamide resins, polyvinyl alcohol resins, ethylene-vinyl alcohol copolymer resins, and chlorinated resins.

Effect of the Invention

According to the present invention, a resin composition including a dispersion of active particles reactive with oxygen in a thermoplastic resin can be produced in a safe and cost-effective manner.

MODE FOR CARRYING OUT THE INVENTION

The process for producing a resin composition according to the present invention includes the steps of: (1) protecting the active particles with a dispersion medium to prevent oxygen in an atmosphere from contacting with the active particles; (2) removing the dispersion medium while melt-kneading the thermoplastic resin and the active particles protected with the dispersion medium to replace the dispersion medium with the thermoplastic resin; and (3) cooling and solidifying the thermoplastic resin with the active particles dispersed therein. Each of the steps will be described.

(1) Step of protecting active particles

The active particles used in the present invention are reactive with oxygen in an atmosphere. Such active particles include nano-metal particles, metal oxides having oxygen defects known as an oxygen absorbing agent (for example, Japanese Patent Application Laid-Open No. 185653/2007 and Japanese Patent Application Laid-Open No. 104064/2005), a metal subjected to hydrogen reduction (for example, Japanese Patent Application Laid-Open No. 277148/1987), and a metal obtained by eluting and removing one metal from an alloy composed of two specific metals that will be described later.

Active particles that are preferred in the present invention include metals obtained by subjecting an alloy including two components, that is, (A) at least one transition metal selected from the group consisting of manganese, iron, platinum, and copper group metals and (B) at least one metal selected from the group consisting of amphoteric metals, magnesium, and silicon, to treatment with an acidic or alkaline aqueous solution to elute and remove at least a part of the component (B).

The transition metal usable as the component (A) is selected from manganese group metals (manganese, technetium, and rhenium), iron group metals (iron, cobalt, and nickel), platinum group metals (ruthenium, rhodium, palladium, osmium, iridium, and platinum), and copper group metals (copper, silver, and gold). The transition metals may be used either solely or in a combination of two or more of them. For example, when iron and nickel are selected, an Fe-Ni alloy may be used as the component (A).

The component (A) is preferably manganese, iron, cobalt, nickel, or copper, more preferably iron, cobalt, nickel, or copper, still more preferably iron or nickel, particularly preferably iron. Among them, iron is preferred because of high safety and low cost.

The component (B) is selected from aluminum, zinc, tin, lead, magnesium, and silicon. They may be used either solely or in a combination of two or more of them. The component (B) is, among the metals exemplified as the component (B), preferably a metal selected from aluminum, zinc, magnesium, and silicon, more preferably aluminum, zinc, magnesium, or silicon, still more preferably aluminum. Among them, aluminum is preferred because of low cost.

An alloy including the component (A) and the component (B) is prepared. Molybdenum, chromium, titanium, vanadium, tungsten and the like may be further added as additive metals to the alloy. The alloy may further include additive components such as cyanic acids.

The alloy including the component (A) and the component (B) may be prepared by a melting method. Regarding the ratio of the component (A) and the component (B) in the alloy, preferably, when the proportion of the component (A) is 20 to 80% by weight, the proportion of the component (B) is 20 to 80% by weight. More preferably, when the proportion of the component (A) is 30 to 70% by weight, the proportion of the component (B) is 30 to 70% by weight. More specifically, for example, when the component (A) and the component (B) are iron or nickel and aluminum, respectively, preferably, the proportion of iron or nickel is 30 to 55% by weight while the proportion of aluminum is 45 to 70% by weight.

The alloy as such may be subjected to treatment with an acidic or alkaline aqueous solution. In general, the alloy is finely ground before the treatment with the acidic or alkaline aqueous solution. The term "alloy" as used herein refers to an alloy having a single composition that has a specific crystal structure, as well as an alloy mixture or a mixture of metals per se.

The alloy may be finely ground by a method properly selected from commonly used metal crushing/grinding methods. An example of the finely grinding method is one in which the alloy is ground by a jaw crusher, a roll crusher, a hammer mill or the like, and, if necessary, fine grinding with a ball mill is further performed. Alternatively, a method may also be adopted in which a molten metal of the alloy is finely ground by rapid solidification such as atomization. When atomization is adopted, fine grinding in an inert gas such as an argon gas is preferred. The atomization may be performed by a method described, for example, in Japanese Patent Application Laid-Open No. 23597/1993.

The particle diameter of the alloy powder is preferably in the range of 5 to 200 μm. The particle size distribution is preferably as narrow as possible. Sieving (classification) with commercially available mesh sieves (for example, 200-mesh sieves) may be properly performed from the viewpoints of removing large particles and providing uniform particle size distribution. The atomization is likely to provide near spherical powder particles and, at the same time, to provide a narrow particle size distribution.

The alloy or alloy powder thus obtained is then treated with an acidic or alkaline aqueous solution to elute and remove at least a part of the component (B). That is, a metal obtained by eluting and removing at least a part of the component (B) from the alloy is used as the oxygen absorbing agent in the storing method according to the present invention. The acidic or alkaline aqueous solution is not particularly limited as long as the acidic or alkaline aqueous solution is one that does not dissolve or hardly dissolves the component (A), but on the other hand, the component (B) is mainly dissolved therein, or one that dissolves both the components (A) and (B) with the dissolution speed of the component (B) being higher than that of the component (A). Examples of acids usable in the acidic aqueous solution include hydrochloric acid, sulfuric acid, and nitric acid. Examples of alkalis usable in the alkaline aqueous solution include sodium hydroxide, potassium hydroxide, calcium hydroxide, tetramethylammonium hydroxide (TMAH), $Na_2CO_3$, $K_2CO_3$, and ammonia. In the acidic or alkaline aqueous solution, a combination of two or more of the acids or a combination of two or more of the alkalis may if necessary be used.

In a preferred embodiment of the present invention, the acidic or alkaline aqueous solution is preferably an alkaline aqueous solution, more preferably an aqueous solution of sodium hydroxide. For example, when aluminum is used as the component (B), the use of an aqueous sodium hydroxide solution as the alkaline aqueous solution is advantageous in that the removal of excess sodium hydroxide by water washing and the removal of eluted aluminum are easy and, thus, the effect of reducing the necessary times of water washing can be expected.

In the treatment with the acidic or alkaline aqueous solution, for alloy powder, it is common practice to introduce the alloy powder little by little into the acidic or alkaline aqueous solution with stirring. Alternatively, a method may be adopted in which the alloy powder is previously placed in water and a concentrated acid or alkali is added dropwise to the water containing the alloy powder.

In the treatment with the acidic or alkaline aqueous solution, the concentration of the acidic or alkaline aqueous solution is, for example, 5 to 60% by weight. More specifically, when sodium hydroxide is used, the concentration is preferably 10 to 40% by weight.

In the treatment with the acidic or alkaline aqueous solution, the temperature of the aqueous solution is, for example, preferably approximately 20 to 120° C., more preferably 25 to 100° C.

The treatment time for the treatment of the alloy or alloy powder with the acidic or alkaline aqueous solution may vary depending, for example, upon the shape, state, and amount of the alloy used, the concentration of the acidic or alkaline aqueous solution, and the temperature of the treatment but is generally approximately 30 to 300 min. The amount of the component (B) eluted from the alloy may be regulated by regulating the treatment time.

In the present invention, at least a part of the component (B) is eluted and removed from the alloy by the treatment with the acidic or the alkaline aqueous solution. Here eluting and removing "at least a part of the component (B)" means the elution and removal of a part of the component (B) from the alloy comprising the component (A) and the component (B), as well as the elution and removal of the whole component (B) from the alloy comprising the component (A) and the component (B). It cannot be denied that there is possibility that, in the process of eluting the component (B), a part of the component (A) is dissolved in the acidic or alkaline aqueous solution. Accordingly, "at least a part of the component (B)" is not limited to the elution of only the component (B) by the treatment with the acidic or alkaline aqueous solution.

At least a part, preferably a large proportion, of the component (B) (for example, aluminum) is eluted from the alloy by the treatment with the acidic or alkaline aqueous solution. The proportion of the elution of the component (B) from the alloy can be expressed in terms of the content (on a weight basis) (residual ratio) of the component (B) in the metal obtained after the elution and removal.

The content of the component (B) in the metal used as the active particles (that is, the metal after the elution of the component (B)) is preferably 0.01 to 50% by weight, more preferably 0.1 to 40% by weight. More specifically, for example, when the alloy is an Al-Fe alloy, the content of aluminum in the metal obtained by eluting and removing aluminum by the treatment with the acidic or alkaline aqueous solution from the alloy is preferably 0.01 to 50% by weight, more preferably 0.1 to 40% by weight, still more preferably 1 to 5% by weight. The content of the component (B) (for example, aluminum) in the metal used in the oxygen absorbing agent may be measured, for example, by an ICP method.

The metal obtained as described above has a porous shape (or is in a porous body form). The porous shape refers to such a state that a number of pores having a size observable under an electron microscope are present on the surface or in the inside of the metal. In the present invention, the porosity in the porous shape of the metal can be expressed in terms of specific surface area. Specifically, the specific surface area of the metal is at least 10 $m^2/g$, preferably at least 20 $m^2/g$, more preferably at least 40 $m^2/g$, as measured by a BET method.

For example, in the present invention, when iron and aluminum are used as the component (A) and the component (B), respectively, the specific surface area (measured by the BET method) of the resultant porous metal is approximately 20 to 120 $m^2/g$, whereas a nonporous conventional iron powder (reduced iron powder or atomized iron powder) has a specific surface area of approximately 0.07 to 0.13 $m^2/g$, demonstrating that the former is porous.

The porosity in the porous shape of the metal may also be expressed in terms of bulk density. The bulk density of the metal used in the oxygen absorbing agent according to the present invention is not more than 2 g/cm$^3$, preferably not more than 1.5 g/cm$^3$. Incidentally, the nonporous conventional iron powder (reduced iron powder or atomized iron powder) has a bulk density of approximately 2 to 3 g/cm$^3$.

In the present invention, the porous metal used as an active metal has a high level of oxygen absorption activity and thus may also be of course suitable for use as an oxygen absorbing agent even under an atmosphere having a low humidity (for example, 30% RH or less (relative humidity) (25° C.)). It is needless to say that the porous metal is also suitable as oxygen absorbing agents even under high-humidity conditions (for example, under 100% RH (relative humidity) (25° C.) conditions).

Accordingly, the metal obtained as described above can absorb at least 5 mL/g of oxygen, more preferably 10 mL/g of oxygen under an atmosphere having a low humidity of 30% RH or less (relative humidity) (25° C.). When active particles formed of the metal are solely used as the oxygen absorbing agent, the amount of oxygen absorbed is 5 to 150 mL/g under an atmosphere having a low humidity of 30% RH or less (relative humidity) (25° C.).

In general, in air, the active particles are disadvantageously immediately reacted with oxygen in an atmosphere, resulting in a lowered oxygen absorbing capability. Accordingly, the contact of the active particles with oxygen should be minimized before the active particles are used. In the present invention, the contact of the active particles with oxygen can be avoided by protecting the active particles with a dispersion medium. Specifically, an oxidation reaction derived from the contact of oxygen molecules with the active particles can be suppressed by covering the circumference of the active particles with the dispersion medium. Dispersion media are not particularly limited as long as the contact of oxygen with the surface of the active particles can be physically or chemically prevented.

For example, the contact of oxygen in the atmosphere with the metal particles can be suppressed by adding active particles to a dispersion medium such as water or an organic solvent to prepare a slurry. Dispersion media are not particularly limited as long as they are not reactive with the metal particles. When organic solvents are used as the dispersion medium, preferably, they have a low ignition point. Examples thereof include, but are not limited to, secondary alcohols such as 2-propanol and 2-butanol, methanol, ethanol, methylene chloride, and methyl ethyl ketone. In particular, when metal particles obtained by eluting and removing a part of the component (B) from an alloy composed of the components (A) and (B) are used as the active particles, in the production process of the metal particles, the elution and removal of the component (B) are generally followed by washing with water, and, thus, the metal particles in a slurry form after washing with water as such may be used in the next replacement step. Further, when the metal particles are stored in a preservation medium (corresponding to the dispersion medium) after the production of the metal particles, a slurry composed of the metal particles and the preservation medium as such may be used in the next replacement step. Such preservation media include those that have a buffer action and are obtained by adding a buffer solution to water, and acidic aqueous solutions obtained by adding an inorganic or organic acid to water.

When slurried active particles are used, the content of the dispersion medium (for example, water or an organic solvent) in the slurry is preferably 10 to 90% by weight, more preferably 10 to 80% by weight, particularly preferably 20 to 70% by weight. When the content of the dispersion medium in the slurry is below the lower limit of the above-defined range, the surface of the active particles cannot be fully covered with the dispersion medium, leading to a possibility of a reaction with oxygen in the atmosphere. On the other hand, when the content of the dispersion medium is above the upper limit of the above-defined range, difficulties are encountered in removing the dispersion medium at a time in a replacement step that will be described later, leading to the necessity of removing the dispersion medium in a plurality of separated steps that render the process complicated.

(2) Replacement step

Next, the dispersion medium is replaced with a thermoplastic resin by removing the dispersion medium while melt-kneading the active particles protected with the dispersion medium and the thermoplastic resin together. The replacement of the dispersion medium present around the circumference of the active particles with a melted thermoplastic resin can allow the active particles to be dispersed in the thermoplastic resin without the contact of the surface of the active particles with oxygen. An example of a method for melt-kneading the active particles protected with the dispersion medium, that is, the mixture composed of the active particles and the dispersion medium, with the thermoplastic resin while removing only the dispersion medium includes adding the mixture composed of the active particles and the dispersion medium to the thermoplastic resin in a publicly known apparatus such as stirring or kneading apparatuses equipped with a heater, for example, kneaders and Banbury mixers, planetary mixers, and butterfly mixers, and monoaxial or multiaxial screw extruders, and stirring the mixture with heating. Simultaneously with kneading of the melted thermoplastic resin with the mixture composed of the active particles and the dispersion medium, the dispersion medium is removed. As a result, when the dispersion medium present around the surface of the active particles has been replaced with the melted thermoplastic resin, a dispersion of the active particles in the melted thermoplastic resin is formed. The use of a screw extruder is preferred from the viewpoints of workability and efficiency by continuous operation.

When the active particles protected with the dispersion medium are added to the thermoplastic resin, various additives may be added in such an amount that does not sacrifice the properties of the resin. Such additives include plasticizers, ultraviolet stabilizers, discoloration inhibitors, matting agents, deodorants, flame retardants, weathering agents, antistatic agents, release agents, antioxidants, and coloring pigments. The addition amount of these additives is preferably 0.01 to 20% by weight based on the thermoplastic resin.

Preferably, the stirring or kneading apparatus is equipped with a devolatilization unit, a dehydration unit, or both a devolatilization unit and a dehydration unit from the viewpoint of efficiently removing the dispersion medium. For example, when the melt kneading is carried out with a screw extruder, the use of a vent-type extruder having a vent at a part of a barrel in the screw extruder is preferred. Alternatively, the vent may be a devolatilization vent with a vacuum pump connected thereto for efficient dispersion medium removal purposes. The dispersion medium is volatilized into gas by heat generated in melt kneading and thus can be removed through the devolatilization unit. Further, a screw extruder including a dehydration slit or a vent stuffer at a part of the barrel may also be used. The use of the stirring or kneading apparatus equipped with the dehydration unit can realize the removal of the dispersion medium with higher efficiency. When the slurry containing the dispersion medium is introduced from a supply zone and is kneaded or compressed with the screw, the dispersion medium can be removed as a liquid from the dehydration slit or the vent stuffer. Further, a screw extruder including a dehydration slit or a vent stuffer at a part of the barrel and having a mixing zone may also be used from the viewpoint of improving a dehydration efficiency to efficiently remove the dispersion medium. Conventional publicly known screws such as Dulmage Screw, Wave Screw, Barrier Screw, Unimelt Screw, HM Screw, Pin Screw, and DIS Screw may be used as the mixing zone. Alternatively, a screw including various mixing segments arranged in combination may be used as the mixing zone. Mixing segments usable herein include forward kneading disks, orthogonal kneading disks, reverse kneading disks, seal rings, pineapple screws, reverse full flight screws, and rotors. The use of the stirring or kneading apparatus equipped with both the devolatilization unit and the dehydration unit can allow the dispersion medium in the slurry to be efficiently removed partly as a gas and partly as a liquid.

In melt kneading with the thermoplastic resin, the use of the stirring or kneading apparatus can allow the dispersion medium to be removed until the content of the dispersion medium in the resultant resin composition is not more than 5000 ppm. When the removal of the dispersion medium is unsatisfactory, hydrolysis or the like of the resin occurs in the melt kneading with the thermoplastic resin, sometimes leading to lowered resin properties.

When the active particles protected with the dispersion medium are melt-kneaded with the thermoplastic resin in a stirring or kneading apparatus, preferably, the melt kneading is carried out in an inert gas atmosphere such as nitrogen or argon or under the reduced pressure. Melt kneading under a low oxygen partial pressure can suppress a deterioration in active particles due to contact of oxygen with the active particles and, at the same time, can suppress oxidation of the thermoplastic resin with oxygen. For example, preferably, the melt kneading is carried out under a low oxygen partial pressure of not more than 10 kPa, more preferably not more than 5 kPa, still more preferably not more than 1 kPa. For example, when the melt kneading is carried out with a screw extruder, the low oxygen partial pressure can be realized by replacing air in the main feeder with an inert gas. When the screw extruder is equipped with the devolatilizaiton unit or the dehydration unit, preferably, a method is adopted in which, for melt kneading under a low oxygen partial pressure, not only the main feeder but also the devolatilization unit and the dehydration unit are subjected to replacement of air with an inert gas or operated under the reduced pressure.

The ratio between the thermoplastic resin and the active particles supplied into the stirring or kneading apparatus may vary depending upon the amount of the dispersion medium that protects the active particles. The ratio of the active particles to the thermoplastic resin is preferably 1 to 80% by weight, more preferably 5 to 70% by weight. When the ratio between the thermoplastic resin and the active particles is in the above-defined range, the active particles can be homogeneously dispersed in the resin while maintaining the function of the active particles dispersed in the resin (for example, an oxygen absorbing capability when the active particles are an oxygen absorbing agent).

There is no particular limitation on the type of the thermoplastic resin used, and examples of such thermoplastic resins include polyolefin resins, polyester resins, polyamide resins, polyvinyl alcohol resins, and chlorine-based resin. In particular, polyethylene, polypropylene, ethylene-vinyl acetate copolymers, elastomers, or mixtures thereof are suitable.

(3) Solidification step

Next, a melt of the thermoplastic resin with the active particles homogeneously dispersed therein is cooled and solidified. Any method may be used without particular limitation for cooling and solidifying the melted thermoplastic resin, and conventional publicly known methods may be adopted. For example, air may be utilized for cooling and solidification. From the viewpoint of suppressing a deterioration in properties of active particles, preferably, a liquid such as water or an inert gas is used as a cooling medium. For example, the melted thermoplastic resin may be cooled and solidified by immersing the melted thermoplastic resin in a water bath. The solidified thermoplastic resin may be properly formed into particles, pellets, strands and the like.

The active particle-containing thermoplastic resin may be molded by a melt extruder or the like into desired forms that are used as oxygen absorbing packaging materials. The form of the oxygen absorbing packaging material is not particularly limited, and examples thereof include single-layer or multilayer sheets, films, trays, cups, and bottles. Examples of methods for molding the thermoplastic resin into sheets or films include a solution casting that includes supplying the thermoplastic resin into an extruder heated to a temperature of the melting point or above, extruding the thermoplastic resin through a die such as a T-die into films or sheets, and rapidly cooling and solidifying the extruded films or sheets, for example, on a cooling drum being rotated, compression molding, and injection molding. Further, publicly known molding methods such as blow molding, injection molding, vacuum molding, pressure forming, bulging, or plug-assist forming may be adopted for molding into cups or bottles. Single-screw extruders, twin-screw extruders, vent extruders, tandem extruders and the like may be used as the melt extruder according to purposes.

The film or sheet thus obtained may be undrawn, or biaxially drawn from the viewpoint of mechanical strength and the like. The biaxial drawing may be carried out by conventional publicly known methods. For example, the film extruded on the cooling drum is then heated by roll heating, infrared heating or the like, followed by drawing in a machine direction to prepare a machine-direction drawn film. The drawing is preferably carried out by utilizing a difference in circumferential speed between two or more rolls. Drawing in a machine direction is generally carried out at a temperature of 50 to 100° C. The drawing ratio in a machine direction may vary depending upon properties required in applications of films but is preferably 2.5 to 4.2 times.

The molded product thus obtained is suitable for use as oxygen absorbing packaging materials. The oxygen absorbing packaging material may have any desired thickness depending upon applications and is about 5 to 500 µm. When the thickness of the oxygen absorbing packaging material is above the upper limit of the above-defined range, the oxygen absorption rate is sometimes lowered.

EXAMPLES

The present invention is further illustrated by the following Examples. However, the present invention is by no means to be construed as being limited to them.

Synthesis Example 1

<Preparation of active particles>

An Al (aluminum) powder (50% by weight) and an Fe (iron) powder (50% by weight) were mixed together and were dissolved in each other in nitrogen to obtain an Al-Fe alloy.

The Al-Fe alloy thus obtained was ground with a jaw crusher, a roll crusher, and a ball mill, and the ground product was classified with a net having an opening of 200 meshes (0.075 mm) to obtain an Al-Fe alloy having a particle size of not more than 200 meshes. The Al-Fe alloy powder (100 g) thus obtained was mixed while stirring for one hr in a 25% (by weight) aqueous sodium hydroxide solution of 50° C. The mixed solution was allowed to stand, and the upper layer liquid was removed. The residual precipitate was washed with distilled water until pH became 10 or less to obtain a porous Al-Fe metal powder (active particles). In order to avoid contact with oxygen, the porous metal powder was obtained by a reaction in an aqueous solution.

Two types of slurries, i.e., a slurry having a water content of 50% by weight (hereinafter referred to as "metal slurry A") and a slurry having a water content of 80% by weight (hereinafter referred to as "metal slurry B"), were prepared from the porous metal powder prepared above by regulating the amount of distilled water.

The porous metal powder thus obtained was dried in vacuo under conditions of not more than 200 Pa and 50° C. to a water content of not more than 1% by weight to obtain a dried product of a porous Al-Fe metal powder (hereinafter referred to as "dried metal powder product"). The dried metal powder product had a bulk density of 1.4 g/cm$^3$ (as measured according to JIS Z 2504). The dried metal powder product (1 g) was dissolved in a small amount of hydrochloric acid, and the solution was diluted with pure water to prepare 50 mL of a diluted solution. The content of Al in the metal powder thus obtained was calculated by an ICP method (ICPE-9000 (multitype), manufactured by Shimadzu Seisakusho Ltd.) using the diluted solution.

The dried metal powder product (1 g) was packaged in an air-permeable small bag and, together with a desiccant, was placed in a gas barrier bag (an Al foil-laminated plastic bag). The gas barrier bag was filled with 400 mL of air (oxygen concentration: 20.9% by volume), was hermetically sealed, and was stored at 25° C. for one day. The concentration of oxygen within the gas barrier bag after the storage was measured by gas chromatography and was found to be 6.5% by volume. The amount of oxygen absorbed was calculated from the oxygen concentration reduced within the gas barrier bag and was found to be 61.6 mL/g.

The average particle diameter of the metal powder was measured with a particle size/shape distribution measuring device ("PITA-2," manufactured by Seishin Enterprise Co., Ltd.) and was found to be about 30 μm. The specific surface area of the metal powder was measured with an automatic specific surface area measuring device ("GEMINI VI 2390," manufactured by Shimadzu Seisakusho Ltd.) and was found to be 24.0 m$^2$/g.

Example 1

The metal slurry A and a linear low-density polyethylene (manufactured by Japan Polyethylene Corporation; MFR 10.5 g/10 min (as measured according to JIS K 7210); hereinafter referred to as "LLDPE") were melt-kneaded in a twin-screw co-rotating extruder (screw diameter 26 mm, L/D value 64) with a main feeder, a vent, and a devolatilization vent. At the outset, the LLDPE was introduced through the main feeder, and the metal slurry A was introduced through the vent with a pump. The LLDPE and the metal slurry A were then introduced into the twin-screw co-rotating extruder while measuring the amounts of the LLDPE and the metal slurry A so that the weight ratio was LLDPE:metal slurry A=60:40. In this case, the pump was handled in air without nitrogen replacement, and the main feeder was handled in an atmosphere having an oxygen concentration of not more than 3% (as measured with an oxygen detector manufactured by NEW COSMOS ELECTRIC CO., LTD.) that was achieved by nitrogen replacement. When the metal slurry A was allowed to stand for 30 min in a tank in the pump before the metal slurry A was introduced into the twin-screw co-rotating extruder, the metal slurry A did not generate heat and was stable. The pressure of the devolatilization vent during the operation was not more than 5 kPa.

Subsequently, the metal slurry A and the LLDPE were melt-kneaded, and water was removed through the devolatilization vent to obtain a melt of LLDPE containing the porous metal powder dispersed therein. The melt was extruded through a strand die and was cooled and solidified in a water bath to obtain a strand having an outer diameter of about 3 mm. The strand was cut with a pelletizer to obtain a resin pellet 1. The resin pellet 1 thus prepared was good, and neither breaking nor foaming was observed in the strand.

The water content of the resin pellet 1 was measured with a desktop coulometric water analyzer (CA-200, manufactured by Mitsubishi Chemical Analytic Co., Ltd.) at a measuring temperature of 185° C. and was found to be 690 ppm based on the total amount of the resin pellet 1.

The resin pellet 1 obtained above was pressed with a pressing machine in nitrogen under conditions of 150° C. and 300 kgf/cm$^2$ to obtain a resin film 1 having a mean thickness of about 150 μm.

The resin film 1 was cut into a size of 10 cm×10 cm to prepare a specimen. The weight of the specimen was 1.75 g, and the amount of the porous metal powder contained in the specimen was calculated from the mixing ratio between the LLDPE and the metal slurry A and was found to be 0.44 g. The specimen, together with a desiccant, was placed in a gas barrier bag (an Al foil-laminated plastic bag). The gas barrier bag was filled with 200 mL of air (oxygen concentration: 20.9% by volume), was hermetically sealed, and was stored at 25° C. for 30 days.

The concentration of oxygen within the gas barrier bag after the storage was measured by gas chromatography and was found to be 16.3%. The amount of oxygen absorbed was calculated from the reduced oxygen concentration within the gas barrier bag. As a result, it was found that the amount of oxygen absorbed per unit weight of the porous metal powder contained in the specimen was found to be 25.0 mL/g.

Example 2

Pellets of polypropylene (manufactured by Japan Polypropylene Corporation; MFR 5.0 g/10 min (as measured according to JIS K 7210); hereinafter referred to as "PP") were ground with an impeller mill and the ground product was classified with a net having an opening of 30 meshes (0.51 mm) to obtain a powder having a size of not more than 30 meshes (hereinafter referred to as "powder PP"). The powder PP and a metal slurry A were mixed together at a weight ratio of powder PP metal:slurry A=85:15 to impregnate the powder PP with the metal slurry A (hereinafter referred to as "wet powder A").

A twin-screw counter-rotating extruder (screw diameter 20 mm, L/D value 25) with a main feeder and a devolatilization vent was provided. The wet powder A was introduced through a main feeder. The main feeder was handled in an atmosphere having an oxygen concentration of not more than 1% (as measured with an oxygen detector manufactured by NEW COSMOS ELECTRIC CO., LTD.) that was achieved by nitrogen replacement. The wet powder A, when introduced through the main feeder, did not generate heat and was stable.

The pressure of the devolatilization vent during the operation was not more than 3 kPa.

Subsequently, the wet powder A was melt-kneaded, and water was removed through the devolatilization vent to obtain a melt of PP containing the porous metal powder dispersed therein. The melt was extruded through a strand die and was cooled and solidified in a water bath to obtain a strand having an outer diameter of about 3 mm. The strand was cut with a pelletizer to obtain a resin pellet 2. The resin pellet 2 thus prepared was good, and neither breaking nor foaming was observed in the strand.

The water content of the resin pellet 2 was measured in the same manner as in Example 1 and was found to be 750 ppm based on the total amount of the resin pellet 2.

The resin pellet 2 obtained above was pressed with a pressing machine in nitrogen under conditions of 180° C. and 300 kgf/cm$^2$ to obtain a resin film 2 having a mean thickness of about 200 μm.

The resin film 2 was cut into a size of 10 cm×10 cm to prepare a specimen. The weight of the specimen was 1.96 g, and the amount of the porous metal powder contained in the specimen was calculated from the mixing ratio between the PP and the metal slurry A and was found to be 0.16 g. The specimen, together with a desiccant, was placed in a gas barrier bag (an Al foil-laminated plastic bag). The gas barrier bag was filled with 150 mL of air (oxygen concentration: 20.9% by volume), was hermetically sealed, and was stored at 25° C. for 30 days.

The concentration of oxygen within the gas barrier bag after the storage was measured by gas chromatography and was found to be 19.0%. The amount of oxygen absorbed was calculated from the reduced oxygen concentration within the gas barrier bag. As a result, it was found that the amount of oxygen absorbed per unit weight of the porous metal powder contained in the specimen was found to be 22.0 mL/g.

Example 3

In the same manner as in Example 2, the powder PP and the metal slurry B were mixed together at a weight ratio of powder PP:metal slurry B=69:31 to impregnate the powder PP with the metal slurry B (hereinafter referred to as "wet powder B").

A twin-screw counter-rotating extruder (screw diameter 20 mm, L/D value 25) with a main feeder and a devolatilization vent was provided. The wet powder B was introduced through the main feeder. The main feeder was handled in an atmosphere having an oxygen concentration of not more than 1% (as measured with an oxygen detector manufactured by NEW COSMOS ELECTRIC CO., LTD.) that was achieved by nitrogen replacement. The wet powder B, when introduced through the main feeder, did not generate heat and was stable. The pressure of the devolatilization vent during the operation was not more than 3 kPa.

Subsequently, the wet powder B was melt-kneaded, and water was removed through the devolatilization vent to obtain a melt of PP containing the porous metal powder dispersed therein. The melt was extruded through a strand die and was cooled and solidified in a water bath to obtain a strand having an outer diameter of about 3 mm. The strand was cut with a pelletizer to obtain a resin pellet 3. In the preparation process of the resin pellet 3, foaming was somewhat observed in the strand as compared with the resin pellet 2. This foaming is considered to derive from the stay of a small amount of the dispersion medium in the melted resin.

The water content of the resin pellet 3 was measured in the same manner as in Example 1 and was found to be 4360 ppm based on the total amount of the resin pellet 3.

The resin pellet 3 obtained above was pressed with a pressing machine in nitrogen under conditions of 180° C. and 300 kgf/cm$^2$ to obtain a resin film 3 having a mean thickness of about 200 μm.

The resin film 3 was cut into a size of 10 cm×10 cm to prepare a specimen. The weight of the specimen was 1.94 g, and the amount of the porous metal powder contained in the specimen was calculated from the mixing ratio between the PP and the metal slurry B and was found to be 0.16 g. The specimen, together with a desiccant, was placed in a gas barrier bag (an Al foil-laminated plastic bag). The gas barrier bag was filled with 150 mL of air (oxygen concentration: 20.9% by volume), was hermetically sealed, and was stored at 25° C. for 30 days.

The concentration of oxygen within the gas barrier bag after the storage was measured by gas chromatography and was found to be 19.3%. The amount of oxygen absorbed was calculated from the reduced oxygen concentration within the gas barrier bag. As a result, it was found that the amount of oxygen absorbed per unit weight of the porous metal powder contained in the specimen was found to be 18.6 mL/g.

Example 4

The metal slurry A and a medium-density polyethylene (manufactured by Prime Polymer Co., Ltd.; MFR 135 g/10 min (as measured according to JIS K 7210); hereinafter referred to as "MDPE") were melt-kneaded in Trimix (tank volume 15 L). At the outset, the metal slurry A and the MDPE were introduced into the tank in Trimix at a weight ratio of MDPE:metal slurry A=70:30. The inside of the tank was evacuated and heated for melt kneading. The metal slurry A introduced into the tank did not generate heat and was stable. After the melt kneading, the tank in Trimix was mounted on a ram press, and the melt was extruded by the ram press through a discharging port having an inner diameter of 25 mm provided at the bottom of the tank and was cooled and solidified in a water bath to obtain a rod-shaped solidified product having an outer diameter of about 25 mm.

The water content of the solidified product was measured in the same manner as in Example 1 and was found to be 1540 ppm based on the total amount of the solidified product.

A necessary amount of the solidified product thus obtained was shaved off and pressed in nitrogen with a pressing machine under conditions of 150° C. and 300 kgf/cm$^2$ to obtain a resin film 4 having a mean thickness of about 150 μm.

The resin film 4 was cut into a size of 10 cm×10 cm to prepare a specimen. The weight of the specimen was 1.62 g, and the amount of the porous metal powder contained in the specimen was calculated from the mixing ratio between the MDPE and the metal slurry A and was found to be 0.29 g. The specimen, together with a desiccant, was placed in a gas barrier bag (an Al foil-laminated plastic bag). The gas barrier bag was filled with 200 mL of air (oxygen concentration: 20.9% by volume), was hermetically sealed, and was stored at 25° C. for 30 days.

The concentration of oxygen within the gas barrier bag after the storage was measured by gas chromatography and was found to be 18.5%. The amount of oxygen absorbed was calculated from the reduced oxygen concentration within the gas barrier bag. As a result, it was found that the amount of oxygen absorbed per unit weight of the porous metal powder contained in the specimen was found to be 20.3 m L/g.

Example 5

A metal slurry A and a high-density polyethylene (manufactured by Japan Polyethylene Corporation; MFR 0.3 g/10 min (as measured according to JIS K 7210); hereinafter referred to as "HDPE") were melt-kneaded in a twin-screw co-rotating extruder (screw diameter 41 mm, L/D value 60) with a main feeder, a dehydration slit, a vent, and a devolatilization vent as viewed from the upstream side. The metal slurry A and the HDPE were introduced into the twin-screw co-rotating extruder while measuring the amounts of the HDPE and the metal slurry A so that the weight ratio was HDPE:metal slurry A=45:55, and melt kneading was carried out in the same manner as in Example 1, except that nitrogen was sprayed on the dehydration slit at a flow rate of 10 L/min from the outside of the extruder. The concentration of oxygen in the main feeder during the operation was not more than 1% (as measured with an oxygen detector manufactured by NEW COSMOS ELECTRIC CO., LTD.), and the concentration of oxygen around the dehydration slit was not more than 4% (as measured with HT-1200N manufactured by HODAKA CO., LTD.). The pressure of the devolatilization vent during the operation was not more than 3 kPa.

Subsequently, the metal slurry A and the HDPE were melt-kneaded, and water was removed through the dehydration slit and the devolatilization vent to obtain a melt of HDPE containing the porous metal powder dispersed therein. The melt was extruded through a strand die and was cooled and solidified in a water bath to obtain a strand having an outer diameter of about 2 mm. The strand was cut with a pelletizer to obtain a resin pellet 5. In this case, it was confirmed that liquid water and water vapor were discharged through the dehydration slit during the operation and water vapor was discharged through the devolatilization vent. What was discharged through the dehydration slit was water and water vapor, and the porous metal powder was absent. Further, the resin pellet 5 thus prepared was good, and neither breaking nor foaming was observed in the strand.

The water content of the resin pellet 5 was measured in the same manner as in Example 1 and was found to be 570 ppm based on the total amount of the resin pellet 5.

The resin pellet 5 obtained above was pressed with a pressing machine in nitrogen under conditions of 180° C. and 300 kgf/cm$^2$ to obtain a resin film 5 having a mean thickness of about 150 μm.

The resin film 5 was cut into a size of 10 cm×10 cm to prepare a specimen. The weight of the specimen was 2.04 g, and the amount of the porous metal powder contained in the specimen was calculated from the mixing ratio between the HDPE and the metal slurry A and was found to be 0.77 g. The specimen, together with a desiccant, was placed in a gas barrier bag (an Al foil-laminated plastic bag). The gas barrier bag was filled with 250 mL of air (oxygen concentration: 20.9% by volume), was hermetically sealed, and was stored at 25° C. for 30 days.

The concentration of oxygen within the gas barrier bag after the storage was measured by gas chromatography and was found to be 11.2%. The amount of oxygen absorbed was calculated from the reduced oxygen concentration within the gas barrier bag. As a result, it was found that the amount of oxygen absorbed per unit weight of the porous metal powder contained in the specimen was found to be 35.5 mL/g.

Example 6

The HDPE and the metal slurry A were melt-kneaded so that the ratio between HDPE and the metal slurry A was HDPE:metal slurry A=45:55 in the same manner as in Example 5, except that a twin-screw co-rotating extruder (screw diameter 41 mm, L/D value 60) with a main feeder, a dehydration slit, a vent stuffer, a vent, and a devolatilization vent as viewed from the upstream side was used. A screw element was disposed at a portion corresponding to a portion between the vent of the screw and the devolatilization vent to squeeze the HDPE and the metal slurry conveyed to the twin-screw co-rotating extruder and thus to separate water. The atmosphere in the main feeder during the operation was replaced with nitrogen in the same manner as in Example 1. Nitrogen (10 L/min) was sprayed on the dehydration slit in the same manner as in Example 5, and nitrogen (10 L/min) was sprayed to an opening in the vent stuffer. The concentration of oxygen in the main feeder was not more than 1% (as measured with an oxygen detector manufactured by NEW COSMOS ELECTRIC CO., LTD.), the concentration of oxygen around the dehydration slit was not more than 4%, and the concentration of oxygen around the vent stuffer opening was not more than 2% (as measured with HT-1200N manufactured by HODAKA CO., LTD.). The pressure of the devolatilization vent during the operation was not more than 3 kPa.

Subsequently, a resin pellet 6 having an outer diameter of about 2 mm was obtained in the same manner as in Example 5. In this case, it was confirmed that liquid water and water vapor were discharged through the dehydration slit and the vent stuffer during the operation and water vapor was discharged through the devolatilization vent. What was discharged through the dehydration slit and the vent stuffer was water and water vapor, and the porous metal powder was absent. Further, the resin pellet 6 thus prepared was good, and neither breaking nor foaming was observed in the strand.

The water content of the resin pellet 6 was measured in the same manner as in Example 1 and was found to be 400 ppm based on the total amount of the resin pellet 6.

The resin pellet 6 obtained above was pressed with a pressing machine in nitrogen under conditions of 180° C. and 300 kgf/cm$^2$ to obtain a resin film 6 having a mean thickness of about 150 μm.

The resin film 6 was cut into a size of 10 cm×10 cm to prepare a specimen. The weight of the specimen was 2.04 g, and the amount of the porous metal powder contained in the specimen was calculated from the mixing ratio between the HDPE and the metal slurry A and was found to be 0.77 g. The specimen, together with a desiccant, was placed in a gas barrier bag (an Al foil-laminated plastic bag). The gas barrier bag was filled with 250 mL of air (oxygen concentration: 20.9% by volume), was hermetically sealed, and was stored at 25° C. for 30 days.

The concentration of oxygen within the gas barrier bag after the storage was measured by gas chromatography and was found to be 10.9%. The amount of oxygen absorbed was calculated from the reduced oxygen concentration within the gas barrier bag. As a result, it was found that the amount of oxygen absorbed per unit weight of the porous metal powder contained in the specimen was found to be 36.4 mL/g.

Comparative Example 1

A resin pellet 4 was prepared in the same manner as in Example 1, except that the dried metal powder product obtained in Synthesis Example 1 was used instead of the metal slurry A and the LLDPE and the dried metal powder product were introduced into the twin-screw co-rotating extruder at a weight ratio of LLDPE:dried metal powder product=75:25. In this case, when the dried metal powder product was allowed to stand within the tank in the pump for 30 min before the LLDPE and the dried metal powder product were introduced into the twin-screw co-rotating extruder, the metal powder came into contact with air and was reacted with oxygen, resulting in heat generation.

The water content of the resin pellet 4 was measured in the same manner as in Example 1 and was found to be 400 ppm based on the total amount of the resin pellet 4.

A resin film 4 was prepared in the same manner as in Example 1, except that the pellet 4 was used. Subsequently, a specimen was prepared in the same manner as in Example 1. The amount of the porous metal powder in the specimen was 0.44 g. The specimen, together with a desiccant, was placed in a gas barrier bag (an Al foil-laminated plastic bag). The gas barrier bag was filled with 200 mL of air (oxygen concentration: 20.9% by volume), was hermetically sealed, and was stored at 25° C. for 30 days.

The concentration of oxygen within the gas barrier bag after the storage was measured by gas chromatography and was found to be 20.1%. The amount of oxygen absorbed was calculated from the reduced oxygen concentration within the gas barrier bag. As a result, it was found that the amount of oxygen absorbed per unit weight of the porous metal powder contained in the specimen was found to be 4.6 mL/g.

The invention claimed is:

1. A process for producing a resin composition comprising at least a thermoplastic resin and active particles that have been dispersed in the thermoplastic resin and are reactive with oxygen in an atmosphere, the process comprising:
    protecting the active particles with a dispersion medium to prevent oxygen in the atmosphere from contacting with the active particles;
    removing the dispersion medium while melt-kneading the thermoplastic resin and the active particles protected with the dispersion medium to replace the dispersion medium with the thermoplastic resin; and
    cooling and solidifying the thermoplastic resin with the active particles dispersed therein,
    wherein the active particles are formed of a metal obtained by subjecting an alloy, which comprises
    at least one transition metal (A) selected from the group consisting of manganese group metals, iron group metals, platinum group metals, and copper group metals and
    at least one additional metal (B) selected from the group consisting of aluminum, zinc, tin, lead, magnesium, and silicon,
    to treatment with an acidic or alkaline aqueous solution to elute and remove at least a part of the at least one additional metal (B).

2. The process according to claim 1, wherein the active particles protected with the dispersion medium are melt-kneaded as a slurry comprising the active particles and the dispersion medium, with the thermoplastic resin.

3. The process according to claim 1, wherein the dispersion medium is selected from the group consisting of water, organic solvents, and mixtures composed of water and organic solvents.

4. The process according to claim 2, wherein the slurry contains 10 to 90% by weight of the dispersion medium.

5. The process according to claim 1, wherein, when the dispersion medium is removed, a part of the dispersion medium is removed as a gas and/or a liquid.

6. The process according to claim 2, wherein the dispersion medium is replaced with the thermoplastic resin by removing the dispersion medium from the slurry until the content of the dispersion medium in the resin composition is not more than 5000 ppm.

7. The process according to claim 1, wherein the dispersion medium is water.

8. The process according to claim 1, wherein the metal obtained by eluting and removing at least a part of the at least one additional metal (B) is porous.

9. The process according to claim 1, wherein the at least one transition metal (A) is selected from the group consisting of iron, cobalt, nickel, and copper.

10. The process according to claim 1, wherein the at least one additional metal (B) is aluminum.

11. The process according to claim 1, wherein the content of the at least one additional metal (B) in the metal obtained by eluting and removing at least a part of the at least one additional metal (B) is 0.01 to 50% by weight.

12. The process according to claim 1, wherein the metal obtained by eluting and removing at least a part of the at least one additional metal (B) has a specific surface area of at least 10 $m^2/g$ as measured by a BET method.

13. The process according to claim 1, wherein the thermoplastic resin is at least one resin selected from the group consisting of polyolefin resins, polyester resins, polyamide resins, polyvinyl alcohol resins, ethylene-vinyl alcohol copolymer resins, and chlorinated resins.

* * * * *